(12) United States Patent
Balbo Block et al.

(10) Patent No.: US 11,377,517 B2
(45) Date of Patent: Jul. 5, 2022

(54) PHOSPHOROUS CONTAINING FLAME RETARDANTS

(71) Applicant: BASF SE, Ludwigshafen (DE)

(72) Inventors: Marco Balbo Block, Hamburg (DE); Jens Ferbitz, Osnabrueck (DE); Christoph Fleckenstein, Freigericht (DE); Birgit Hupka, Duesseldorf (DE)

(73) Assignee: BASF SE, Ludwigshafen (DE)

( * ) Notice: Subject to any disclaimer, the term of this patent is extended or adjusted under 35 U.S.C. 154(b) by 223 days.

(21) Appl. No.: 14/785,095

(22) PCT Filed: Apr. 15, 2014

(86) PCT No.: PCT/EP2014/057605
§ 371 (c)(1),
(2) Date: Oct. 16, 2015

(87) PCT Pub. No.: WO2014/170316
PCT Pub. Date: Oct. 23, 2014

(65) Prior Publication Data
US 2016/0083500 A1   Mar. 24, 2016

(30) Foreign Application Priority Data
Apr. 16, 2013 (EP) .................................. 13163957

(51) Int. Cl.
| | | |
|---|---|---|
| *C08G 18/38* | (2006.01) | |
| *C08G 18/08* | (2006.01) | |
| *C07F 9/12* | (2006.01) | |
| *C08G 18/50* | (2006.01) | |
| *C07F 9/32* | (2006.01) | |
| *C08G 18/48* | (2006.01) | |
| *C08G 18/42* | (2006.01) | |
| *C08G 18/40* | (2006.01) | |
| *C07F 9/09* | (2006.01) | |
| *C08G 18/65* | (2006.01) | |
| *C08G 18/66* | (2006.01) | |
| *C08G 18/76* | (2006.01) | |

(52) U.S. Cl.
CPC .............. *C08G 18/14* (2013.01); *C07F 9/093* (2013.01); *C07F 9/12* (2013.01); *C07F 9/3258* (2013.01); *C08G 18/3878* (2013.01); *C08G 18/4018* (2013.01); *C08G 18/4216* (2013.01); *C08G 18/4816* (2013.01); *C08G 18/4825* (2013.01); *C08G 18/4841* (2013.01); *C08G 18/4875* (2013.01); *C08G 18/4883* (2013.01); *C08G 18/5075* (2013.01); *C08G 18/5078* (2013.01); *C08G 18/6552* (2013.01); *C08G 18/6666* (2013.01); *C08G 18/7621* (2013.01); *C08G 2110/0008* (2021.01); *C08G 2110/0025* (2021.01); *C08G 2110/0083* (2021.01)

(58) Field of Classification Search
CPC ............ C07F 9/14–14006; C07F 9/093; C07F 9/3258; C07F 9/12; C08G 18/3878; C08G 18/4018; C08G 18/4216; C08G 18/4816; C08G 18/4825; C08G 18/4841; C08G 18/4875; C08G 18/4883; C08G 18/5075; C08G 18/5078; C08G 18/6652; C08G 18/6666; C08G 18/7621; C08G 18/14
See application file for complete search history.

(56) References Cited

U.S. PATENT DOCUMENTS

| | | | | |
|---|---|---|---|---|
| 3,321,555 | A | * | 5/1967 | Lutz .......................... C07F 9/09 252/609 |
| 3,355,436 | A | | 11/1967 | Lutz et al. |
| 4,450,280 | A | * | 5/1984 | Pawloski ................ C07F 9/091 549/221 |
| 5,506,275 | A | | 4/1996 | Valoppi |
| 2005/0113495 | A1 | | 5/2005 | Hussain et al. |

(Continued)

FOREIGN PATENT DOCUMENTS

| | | | |
|---|---|---|---|
| CA | 02799344 A1 | * | 11/2011 |
| CN | 1882629 A | | 12/2006 |
| EP | 0 090 444 A2 | | 10/1983 |

(Continued)

OTHER PUBLICATIONS

Translation of WO 2010012736 by Mohmyer et al. (Year: 2010).*
Hairston, N. Phosphorus: time for us to oust bad spelling. Nature 426, 119 (2003). https://doi.org/10.1038/426119c (Year: 2003).*
Machine translation of JP 2011079950 by Iwata et al. (Year: 2011).*
Combined Chinese Office Action and Search Report dated Aug. 15, 2016 in Patent Application No. 201480021909.3 (with English translation of Office Action and English translation of categories of cited documents).
U.S. Appl. No. 13/559,786, filed Jul. 27, 2012, US 2013/0030066 A1, Klaus Hahn, et al.

(Continued)

*Primary Examiner* — Michael M Dollinger
*Assistant Examiner* — Christina H. W. Rosebach
(74) *Attorney, Agent, or Firm* — Armstrong Teasdale LLP

(57) ABSTRACT

The present invention relates to a phosphorus containing polyol, obtainable or obtained by a process comprising the reaction of at least one polyol with a phosphorus containing compound of the general formula (I) as defined herein, as well as the process for preparing a phosphorus containing polyol, comprising the reaction of at least one polyol with a phosphorus containing compound of the general formula (I). Furthermore, the present invention relates to the use of a phosphorus containing polyol as disclosed herein as a flame retardant, to a process for the preparation of a polyurethane and the polyurethane as such.

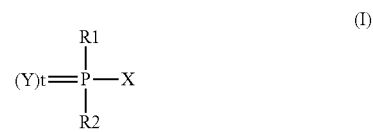

(I)

11 Claims, No Drawings

(56) References Cited

U.S. PATENT DOCUMENTS

| | | | |
|---|---|---|---|
| 2012/0010312 A1 | 1/2012 | Balbo Block et al. | |
| 2014/0058035 A1* | 2/2014 | Qi | C08K 5/524 524/710 |

FOREIGN PATENT DOCUMENTS

| | | |
|---|---|---|
| EP | 0364854 A2 | 4/1990 |
| EP | 0 474 076 B1 | 9/1995 |
| EP | 0 897 402 A1 | 2/1999 |
| EP | 0 989 146 A1 | 3/2000 |
| EP | 1 460 094 A1 | 9/2004 |
| EP | 1529792 A1 | 5/2005 |
| GB | 1059507 A | 2/1967 |
| JP | 2011-79950 A | 4/2011 |
| WO | WO 97/42244 | 11/1997 |
| WO | WO 03/104374 A1 | 12/2003 |
| WO | WO 2004/076509 A2 | 9/2004 |
| WO | WO 2005/052018 A2 | 6/2005 |
| WO | WO 2005/052031 A1 | 6/2005 |
| WO | WO 2005/090440 A1 | 9/2005 |
| WO | WO 2006/034800 A1 | 4/2006 |
| WO | WO 2006/042674 A1 | 4/2006 |
| WO | WO 2007/066383 A1 | 6/2007 |
| WO | WO 2010/080425 A1 | 7/2010 |
| WO | WO-2012126380 A1 * | 9/2012 ........... C07D 407/12 |

OTHER PUBLICATIONS

U.S. Appl. No. 14/426,535, filed Mar. 6, 2015, US 2015/0232631 A1, Marco Balbo Block, et al.

U.S. Appl. No. 14/166,151, filed Jan. 28, 2014, US 2014/0213680 A1, Marco Balbo Block, et al.

International Search Report dated May 14, 2014 in PCT/EP2014/057605.

International Preliminary Reporton Patentability dated Jun. 30, 2015 in PCT/EP2014/057605 filed Apr. 15, 2014.

"Organophosphorus Compounds" Science of Synthesis, Original Edition, Georg Thieme Verlag KG, vol. 42, 2008, 38 Pages (submitting Table of Contents and Statement of Relevancy only).

* cited by examiner

PHOSPHOROUS CONTAINING FLAME RETARDANTS

The present invention relates to a phosphorus containing polyol, obtainable or obtained by a process comprising the reaction of at least one polyol with a phosphorus containing compound of the general formula (I) as defined herein, as well as the process for preparing a phosphorus containing polyol, comprising the reaction of at least one polyol with a phosphorus containing compound of the general formula (I). Furthermore, the present invention relates to the use of a phosphorus containing polyol as disclosed herein as a flame retardant, to a process for the preparation of a polyurethane and the polyurethane as such.

There are many different methods for providing flame retardancy to polymers, in particular polyurethanes, and very particularly polyurethane foams. A first method is formation of a crust to prevent the flame from reaching the combustible material. Thermal hydrolysis products remove oxygen from the polymer matrix and lead to formation of a layer of carbon on the surface of the polymer. This layer of carbon prevents the flame from causing either thermal or oxidative decomposition of the plastic located below the layer. The term used is intumescence. Phosphorus-containing compounds, and among these organophosphorus compounds, are widely used to form a carbonized crust in the event of a fire. Organophosphorus flame retardants are mostly based on phosphate esters, on phosphonate esters, or on phosphite esters.

Halogenated compounds are also used as flame retardants. In contrast to phosphorus-containing flame retardants, these act within the gas phase of the flame. Low-reactivity free halogen radicals here scavenge various high-reactivity free radicals derived from degradation products of the polymer, thus inhibiting fire propagation by way of free radicals. Bromine-containing flame retardants are particularly effective here. Another particularly effective flame retardant is trichloroisopropyl phosphate (TCPP), which comprises not only phosphate but also the halogen chlorine, and thus acts by way of both of the mechanisms described above.

However, halogenated flame retardants, in particular bromine-containing flame retardants, are undesirable for toxicological, environmental, and regulatory reasons. Halogen-containing flame retardants also increase smoke density in the event of a fire. Attempts are therefore being made to achieve general avoidance of halogen-containing flame retardants.

Examples of known halogen-free flame retardants are solid flame retardants such as melamine or ammonium polyphosphate. These solid particles have adverse effects on the polymers, in particular on the properties of polyurethane foams. Solid flame retardants also specifically cause problems during the production of the polyurethanes. By way of example, the production of polyurethanes preferably uses liquid starting materials, including those in the form of solutions. The use of solid particles leads to separation phenomena in the mixtures usually used for polyurethane production, and the life of batches is therefore only about one day. The solid flame retardant particles moreover abrade the metering units, for example in the foam plants. Said flame retardants also have an adverse effect on the chemical processes during the foaming process and have an adverse effect on the properties of the foam.

Many liquid flame retardants, such as triethyl phosphate (TEP) or diethyl ethane-phosphonate (DEEP), contribute by way of example to emissions from the plastics, giving these an unpleasant odor. The liquid flame retardants moreover have an adverse effect on the foaming reaction during the production of polyurethane foams, and also on the properties of the foams, for example mechanical properties. Known liquid flame retardants also frequently act as plasticizers.

In order to counter problems with emissions, incorporatable flame retardants have been developed for polyurethanes. Incorporatable flame retardants, such as Exolit®OP560 from Clariant, generally have functionality smaller or equal to 2 with respect to isocyanates and frequently reduce crosslinking density in polyurethane foams, thus impairing the properties of the foam, in particular in rigid polyurethane foam.

WO 2003/104374 A1, WO 2004/076509 A2, and WO 2005/052031 A1 describe the use of phosphonic-acid-reacted, hyperbranched polyacrylonitrile polyacrylamide, polyamide, and polyamine as rust preventer, lubricant, textile additive, and flame retardant. Said compounds are not suitable for use for polyurethanes and in particular polyurethane foams, since the nitrogen-containing structures severely affect the catalysis of the foam-formation process.

WO 2010/080425 A1 discloses a method of making hydroxymethylphosphonate comprising heating paraformaldehyde in a solvent to a desired reaction temperature, wherein the solvent is present in at least an amount necessary to solvate or suspend the paraformaldehyde; adding at least one alkyl phosphite to the heated paraformaldehyde, to provide hydroxymethylphosphonate, the alkyl phosphite being added to the heated paraformaldehyde at a rate which will avoid or inhibit the production of a significant exotherm and resulting high/significant level of acid byproduct(s), there being present in the reaction medium at least one hindered amine catalyst in which the nitrogen in the amine is directly bound to a secondary and/or tertiary carbon of an organic group; and, optionally, following the completion of the addition, heating the reaction mixture to an elevated temperature. The use of the products obtained for the preparation of polyurethanes is also disclosed. The polyurethanes obtained show problems with emission of formaldehyde.

In EP 474076 B1, Bayer AG describes highly branched polyphosphates as flame retardants for polycarbonates. The structure of these materials, made of aromatic dihydroxy compounds and of phosphonate esters or polyphosphorus compounds, gives them poor solubility in the polyols used for polyurethane production, and this makes it difficult to process this class of compound in polyurethanes.

WO 2007/066383 describes hyperbranched polyesters which were reacted with phosphorus compounds, such as 9,10-dihydro-9-oxa-10-phosphaphenanthrene 10-oxide, and also the use of these as flame retardants for resins. The low thermal and hydrolytic stability of the ester groups is disadvantageous.

It was therefore an object of the present invention to provide a halogen-free flame retardant which can also be used in the production of polyurethanes.

Another object of the present invention was to provide flame retardants whose use does not lead to emissions in polymers, in particular in polyurethanes, and specifically in polyurethane foams, and whose use in polymers, in particular in polyurethanes and specifically in polyurethane foams, does not lead to impairment of properties, in particular of mechanical properties.

These objects of the invention are achieved by a phosphorus containing polyol, obtainable or obtained by a process comprising the reaction of at least one polyol with a phosphorus containing compound of the general formula (I):

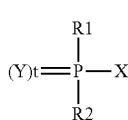

(I)

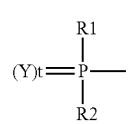

(II)

wherein X represents Cl, Br, I, alkoxy, or hydrogen,
Y represents O or S,
t is 0 or 1,
R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-aryloxy.

The phosphorous containing polyols according to the present invention can be prepared by a process for preparing a phosphorus containing polyol, comprising the reaction of at least one polyol with a phosphorus containing compound of the general formula (I):

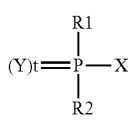

(I)

wherein X represents Cl, Br, I, alkoxy, or hydrogen,
Y represents O or S,
t is 0 or 1,
R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-arylox,
which is also subject of the present invention.

As a solution the phosphorous containing polyols according to the invention based on a partial phosphorylation of polyalcohols were found. The synthesis is an easy one-step reaction based on cheap raw materials. Due to the diversity of polyols which can be used as starting materials, a wide range of phosphorous containing polyols can be easily obtained to adjust performance and processing as desired.

The phosphorous containing polyols according to the present invention work as flame retardants and at the same time can improve mechanical properties (or prevent deterioration of properties as observed with non-reactive flame retardants). The flame retardancy is not only influenced by the phosphorous content but although by the OH-functionality as well as the type of the polyalcohol indicating synergistic effects.

By varying the degree of partial phosphorylation, the hydroxyl-number of the hyperbranched molecule can be adjusted to OH-values common either for flexible or for rigid foam. Thus the phosphorous containing polyol can be easily blended with common polyols and show minimum interference on foaming. Thus tailor-made flame retardants for flexible and rigid polyurethane foams are provided.

The phosphorus containing polyol according to the present invention comprises at least one phosphorus-containing group. This at least one phosphorus-containing group is preferably a group of the general formula (II):

wherein
Y represents O or S,
t is 0 or 1,
R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-aryloxy.

R1 and R2, identical or different, are preferably C1-C16-alkyl, C1-C16-alkoxy, C3-C10-cycloalkyl, C3-C10-cycloalkoxy, aryl or aryloxy. Y is preferably 0 and t is preferably 1.

It is particularly preferable that R1 and R2 are identical, each being phenyl, methoxy-phenyl, tolyl, furyl, cyclohexyl, phenoxy, benzyl, benzyloxy, ethoxy, or methoxy.

The phosphorous containing polyol can also comprise two or more different phosphorous containing groups, preferably two or more different groups of the general formula (II). The phosphorus is preferably present in the form of phosphate or phosphinate groups.

According to a further embodiment, the present invention therefore is directed to a phosphorus containing polyol as disclosed above, wherein the phosphorus is present in the form of phosphate or phosphinate groups.

To produce the phosphorous containing polyols comprising at least one phosphorus-containing group, according to the present invention preferably at least one polyol is reacted with a phosphorus containing compound of the general formula (I):

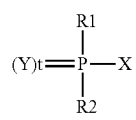

(I)

wherein X represents Cl, Br, I, alkoxy, or hydrogen,
Y represents O or S,
t is 0 or 1,
R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-aryloxy.

The compounds of the formula (I) are known and commercially available, or can be prepared by using synthetic routes well known from the literature. Synthetic routes are described by way of example in Science of Synthesis 42 (2008); Houben Weyl E1-2 (1982); Houben Weyl 12 (1963-1964)].

The reaction of the at least one polyol and the phosphorus containing compound of the general formula (I) can take place in the presence of a base.

Examples of suitable bases are metal hydrides, such as sodium hydride, or non-nucleophilic amine bases, such as triethylamine or Hunig's base, bicyclic amines, such as DBU, N-methylimidazole, or N-methylmorpholine, N-methylpiperidine, pyridine, or substituted pyridines, such as lutidine. Triethylamine and N-methylimidazole are particularly preferred. The amounts used of the bases here are generally equimolar. However, the bases can also be used in excess or, if appropriate, as solvent.

The polyols used for the preparation of the phosphorous containing polyols according to the present invention can generally be any suitable polyols having at least two reactive hydrogen atoms, examples being those having functionality of from 3 to 8, preferably 3, 4 or 5, and preferably a molecular weight of from 100 to 700. It is therefore possible by way of example to use polyols selected from the group of the polyether polyols, polyester polyols, and mixtures thereof.

Therefore, the phosphorus containing polyol of the present invention preferably has an OH-functionality of from 0 to 8, preferably from 1 to 5, in particular 2, 3 or 4. According to a further embodiment, the present invention therefore is directed to a phosphorus containing polyol as disclosed above, wherein the phosphorous containing polyol has an OH-functionality of from 0 to 8.

Furthermore, the phosphorus containing polyol of the present invention preferably has a molecular weight of from 100 to 700 g/mol. According to a further embodiment, the present invention therefore is directed to a phosphorus containing polyol as disclosed above, wherein the phosphorous containing polyol has a molecular weight of from 100 to 700 g/mol.

By way of example, polyetherols are produced from epoxides, such as propylene oxide and/or ethylene oxide, or from tetrahydrofuran, by using starter compounds containing active hydrogen, e.g. aliphatic alcohols, phenols, amines, carboxylic acids, water, or compounds based on natural materials, e.g. sucrose, sorbitol, or mannitol, with use of a catalyst. Preferably, polyetherols produced from propylene oxide and/or ethylene oxide are used as polyols.

The polyols preferably have a OH number in the range of 2 to 800 mg KOH/g, in particular in the range of 25 to 200 mg KOH/g, more particular in the range of 100 to 150 mg KOH/g.

The amounts reacted of the starting materials are generally stoichiometric in relation to the desired degree of functionalization. It can be advantageous to use an excess of the phosphorus component with respect to the hydroxy functionalities of the polyol. Random partial phosphorylation can be achieved by using less than the stoichiometric amount of the phosphorus component. The ratios of the starting materials used are preferably such that the phosphorus content of the phosphorous containing polyol of the invention, comprising at least one phosphorus-containing group, is at least 3% by weight, with particular preference at least 5% by weight and in particular at least 7% by weight.

Preferably the phosphorus content of the phosphorous containing polyol of the invention, comprising at least one phosphorus-containing group, is at least 3% by weight, with particular preference in the range of from 4 to 12% by weight, more preferably in the range of from 6 to 9% by weight. According to a further embodiment, the present invention therefore is directed to a phosphorus containing polyol as disclosed above, wherein the phosphorous containing polyol has a phosphorous content of from 3 to 12% by weight based on the total weight of the phosphorous containing polyol.

Another precondition for the stated phosphorus content here, alongside the amount of compound of the formula (I), is the presence of sufficient OH groups in the phosphorous containing polyol. These amounts can be adjusted via appropriate conduct of the reaction during production of the phosphorous containing polyol, in particular via the proportion of the at least trifunctional polyols, and the reaction time, which controls the conversion and therefore the molecular weight of the resultant polyol. It is possible here that all, or a portion of, the OH groups within the polyol are reacted with the phosphorus component.

The reaction here for producing the phosphorous containing polyol of the invention, comprising at least one phosphorus-containing group, is preferably carried out in the presence of a solvent. Suitable solvents for the phosphorylation reactions are inert organic solvents, such as DMSO, halogenated hydrocarbons, such as methylene chloride, chloroform, 1,2-dichloroethane, or chlorobenzene. Solvents which are further suitable are ethers, such as diethyl ether, methyl tert-butyl ether, dibutyl ether, dioxane, or tetrahydrofuran. Solvents which are further suitable are hydrocarbons, such as hexane, benzene, or toluene. Solvents which are further suitable are nitriles, such as acetonitrile or propionitrile. Solvents which are further suitable are ketones, such as acetone, butanone, or tert-butyl methyl ketone. It is also possible to use a mixture of the solvents, and it is also possible to operate without solvent.

The reaction is usually carried out at temperatures of from 0° C. up to the boiling point of the reaction mixture, preferably from 0° C. to 110° C., particularly preferably at from room temperature to 110° C.

The reaction mixtures are worked up in the usual way, e.g. via filtration, mixing with water, separation of the phases and, if appropriate, chromatographic purification of the crude products. The products sometimes take the form of high-viscosity oils, which are freed from volatile constituents, or purified, at reduced pressure and at slightly elevated temperature. To the extent that the resultant products are solids, the purification process can also use recrystallization or digestion.

The phosphorous containing polyol of the invention, comprising at least one phosphorus-containing group, is used as flame retardant. The phosphorous containing polyol of the invention can be used in crosslinking polymers, for example in polyurethane, e.g. polyurethane foams.

If the phosphorous containing polyol of the invention, comprising at least one phosphorus-containing group, is used in thermoplastics, including in thermoplastic polyurethane, the phosphorous containing polyol of the invention, comprising at least one phosphorus-containing group, preferably comprises less than 10% of, and with particular preference less than 2% of, and in particular no, free OH groups, based in each case on the entirety of phosphorus-containing groups and OH groups. This is achieved via reaction of the phosphorous containing polyol of the invention with the compound of the general formula (II) in an appropriate ratio.

For the purposes of the invention, polyurethane comprises all of the known polyisocyanate polyaddition products. These comprise adducts of isocyanate and alcohol, and they also comprise modified polyurethanes which can comprise isocyanurate structures, allophanate structures, urea structures, carbodiimide structures, uretonimine structures, and biuret structures, and which can comprise further isocyanate adducts. These polyurethanes of the invention comprise in particular solid polyisocyanate polyaddition products, e.g. thermosets, and foams based on polyisocyanate polyaddition products, e.g. flexible foams, semirigid foams, rigid foams, or integral foams, and also polyurethane coatings and binders. For the purposes of the invention, the term polyurethanes also includes polymer blends comprising polyurethanes and further polymers, and also foams made of said polymer blends. It is preferable that the phosphorous containing polyols of the invention, comprising at least one phosphorus-containing group, are used in producing polyurethane foams.

For the purposes of the invention, polyurethane foams are foams according to DIN 7726. The compressive stress value for flexible polyurethane foams of the invention at 10% compression, or the compressive strength of these foams according to DIN 53 421/DIN EN ISO 604, is 15 kPa or less, preferably from 1 to 14 kPa, and in particular from 4 to 14 kPa. The compressive stress value for semirigid polyurethane foams of the invention at 10% compression to DIN 53 421/DIN EN ISO 604 is from greater than 15 to less than 80 kPa. The open-cell factor to DIN ISO 4590 of semirigid polyurethane foams of the invention and of flexible polyurethane foams of the invention is preferably greater than 85%, particularly preferably greater than 90%. Further details concerning flexible polyurethane foams of the invention and semirigid polyurethane foams of the invention are found in "Kunststoffhandbuch, Band 7, Polyurethane" [Plastics handbook, volume 7, Polyurethanes], Carl Hanser Verlag, 3rd edition, 1993, chapter 5.

The compressive stress value for rigid polyurethane foams of the invention at 10% compression is greater than or equal to 80 kPa, preferably greater than or equal to 120 kPa, particularly preferably greater than or equal to 150 kPa. The closed-cell factor to DIN ISO 4590 for the rigid polyurethane foam is moreover greater than 80%, preferably greater than 90%. Further details concerning rigid polyurethane foams of the invention are found in "Kunststoffhandbuch, Band 7, Polyurethane" [Plastics handbook, volume 7, Polyurethanes], Carl Hanser Verlag, 3rd edition, 1993, chapter 6.

For the purposes of this invention, elastomeric polyurethane foams are polyurethane foams according to DIN 7726, where these exhibit no residual deformation beyond 2% of their initial thickness 10 minutes after brief deformation amounting to 50% of their thickness to DIN 53 577. This foam can be a rigid polyurethane foam, a semirigid polyurethane foam, or a flexible polyurethane foam.

Integral polyurethane foams are polyurethane foams according to DIN 7726 having a marginal zone in which the density is higher than in the core, as a result of the shaping process. The overall density here averaged over the core and the marginal zone is preferably above 100 g/L. For the purposes of the invention, integral polyurethane foams can again be rigid polyurethane foams, semirigid polyurethane foams, or flexible polyurethane foams. Further details concerning the integral polyurethane foams of the invention are found in "Kunststoffhandbuch, Band 7, Polyurethane" [Plastics handbook, volume 7, Polyurethanes], Carl Hanser Verlag, 3rd edition, 1993, chapter 7.

Polyurethanes are obtained here by mixing isocyanates (a) with polyols (b), with a phosphorous containing polyol according to the invention (c) and, if appropriate, with blowing agent (d), with catalyst (e), and with other auxiliaries and additives (f) to give a reaction mixture and permitting completion of the reaction.

Therefore, the present invention is directed to a process for the preparation of a polyurethane comprising the reaction of at least one isocyanate (a), at least one polyol (b) and at least one phosphorus containing polyol as disclosed above or a phosphorus containing polyol obtainable or obtained according to the process as disclosed above.

Polyisocyanate components (a) used for producing the polyurethanes of the invention comprise all of the polyisocyanates known for producing polyurethanes. These comprise the aliphatic, cycloaliphatic, and aromatic di- or polyfunctional isocyanates known from the prior art, and also any desired mixtures thereof. Examples are diphenylmethane 2,2"-, 2,4"-, and 4,4"-diisocyanate, the mixtures of monomeric diphenylmethane diisocyanates and of diphenylmethane diisocyanate homologues having a larger number of rings (polymer MDI), isophorone diisocyanate (IPDI) and its oligomers, tolylene 2,4- or 2,6-diisocyanate (TDI) and mixtures of these, tetramethylene diisocyanate and its oligomers, hexamethylene diisocyanate (HDI) and its oligomers, naphthylene diisocyanate (NDI), and mixtures thereof.

It is preferable to use tolylene 2,4- and/or 2,6-diisocyanate (TDI) or a mixture of these, monomeric diphenylmethane diisocyanates and/or diphenylmethane diisocyanate homologues having a larger number of rings (polymer MDI) and mixtures of these. Other possible isocyanates are given by way of example in "Kunststoffhandbuch, Band 7, Polyurethane" [Plastics handbook, volume 7, Polyurethanes], Carl Hanser Verlag, 3rd edition, 1993, chapters 3.2 and 3.3.2.

Polyisocyanate component (a) can be used in the form of polyisocyanate prepolymers. Said polyisocyanate prepolymers are obtainable by reacting an excess of polyisocyanates (constituent (a-1)) described above with polyols (constituent (a-2)), for example at temperatures of from 30 to 100° C., preferably about 80° C., to give the prepolymer.

Polyols (a-2) are known to the person skilled in the art and are described by way of example in "Kunststoffhandbuch, 7, Polyurethane" [Plastics handbook, volume 7, Polyurethanes], Carl Hanser Verlag, 3rd edition, 1993, chapter 3.1. By way of example, therefore, the polyols used can also comprise the polyols described below under (b). In one particular embodiment here, the polyisocyanate prepolymer can also comprise the phosphorous containing polyol of the invention, comprising at least one phosphorus-containing group.

Polyols that can be used comprise all of the compounds (b) known for polyurethane production and having at least two reactive hydrogen atoms, examples being those having functionality of from 2 to 8 and molecular weight of from 400 to 15 000. It is therefore possible by way of example to use polyols selected from the group of the polyether polyols, polyester polyols, and mixtures thereof.

By way of example, polyetherols are produced from epoxides, such as propylene oxide and/or ethylene oxide, or from tetrahydrofuran, by using starter compounds containing active hydrogen, e.g. aliphatic alcohols, phenols, amines, carboxylic acids, water, or compounds based on natural materials, e.g. sucrose, sorbitol, or mannitol, with use of a catalyst. Mention may be made here of basic catalysts or double-metal-cyanide catalysts, as described by way of example in PCT/EP2005/010124, EP 90444 or WO 05/090440.

By way of example, polyesterols are produced from aliphatic or aromatic dicarboxylic acids and from polyfunctional alcohols, from polythioether polyols, from polyesteramides, from polyacetals containing hydroxy groups, and/or from aliphatic phosphorous containing polyols containing hydroxy groups, preferably in the presence of an esterification catalyst. Other possible polyols are given by way of example in "Kunststoffhandbuch, Band 7, Polyurethane" [Plastics handbook, volume 7, Polyurethanes], Carl Hanser Verlag, 3rd edition, 1993, chapter 3.1.

Polyols (b) also comprise chain extenders and crosslinking agents. The molar mass of chain extenders and crosslinking agents is less than 400 g/mol, and the term used here for molecules having two hydrogen atoms reactive toward isocyanate is chain extenders, while the term used for molecules having more than two hydrogens reactive toward isocyanate is crosslinking agents. Although it is possible here to omit the chain extender or crosslinking agent, addition of chain extenders or crosslinking agents or else, if appropriate, a mixture thereof has proven advantageous for modifying mechanical properties, e.g. hardness.

If chain extenders and/or crosslinking agents are used, it is possible to use the chain extenders and/or crosslinking agents that are known for the production of polyurethanes. These are preferably low-molecular-weight compounds having functional groups reactive toward isocyanates, examples being glycerol, trimethylol-propane, glycol, and diamines. Other possible low-molecular-weight chain extenders and/or crosslinking agents are given by way of example in "Kunststoffhandbuch, Band 7, Polyurethane" [Plastics handbook, volume 7, Polyurethanes], Carl Hanser Verlag, 3rd edition, 1993, chapters 3.2 and 3.3.2.

A phosphorous containing polyol of the invention, comprising at least one phosphorus-containing group, is used as component (c). The proportion of phosphorous containing polyol comprising at least one phosphorus-containing group (c), hereinafter also termed phosphorous containing polyol (c), is subject to no restriction here and depends primarily on the degree of flame retardancy to be achieved.

Furthermore, according to the present invention, it is possible to adjust the phosphorous containing polyol to the polyol (b) used for the preparation of the polyurethane, e.g. by choosing a suitable molecular weight. Therefore, it is for example possible to obtain improved mechanical properties of the polyurethane prepared. According to the present invention, it is also possible to use a mixture of two or more different phosphorous containing polyols.

The proportion of phosphorous containing polyol here can by way of example vary from 0.1 to 50% by weight, preferably from 1 to 40% by weight, and particularly preferably from 2 to 30% by weight, based in each case on the total weight of components (a) to (e). The phosphorus content in the finished polyurethane here is preferably from 0.01 to 10% by weight, particularly preferably from 0.05 to 5% by weight, and in particular from 0.1 to 5% by weight, based in each case on the total weight of the polyurethane.

The proportion of phosphorous containing polyol used based on the total amount of polyol used can be adjusted. By way of example, the proportion of phosphorous containing polyol based on the total amount of polyol is in the range of 1 to 30%, preferably in the range of 5 to 20% for the preparation of a flexible foam. By way of example, the proportion of phosphorous containing polyol based on the total amount of polyol is in the range of 2 to 50%, preferably in the range of 10 to 40% for the preparation of a rigid foam.

According to a further embodiment, the present invention is directed to a process for the preparation of a polyurethane as disclosed above, wherein the at least one phosphorus containing polyol is used in an amount of 1 to 30% of the total of all polyols used or in an amount of 2 to 50% of the total of all polyols used.

The reaction mixtures of the invention preferably also comprise blowing agents (d) if the polyurethane is intended to take the form of polyurethane foam. It is possible here to use any of the blowing agents known for producing polyurethanes. These can comprise chemical and/or physical blowing agents. These blowing agents are described by way of example in "Kunststoffhandbuch, Band 7, Polyurethane" [Plastics handbook, volume 7, Polyurethanes], Carl Hanser Verlag, 3rd edition, 1993, chapter 3.4.5. The term chemical blowing agents is used here for compounds which form gaseous products via reaction with isocyanate. Examples of these blowing agents are water and carboxylic acids. The term physical blowing agents is used here for compounds which have been dissolved or emulsified in the starting materials for polyurethane production and which evaporate under the conditions of polyurethane formation. By way of example, these are hydrocarbons, halogenated hydrocarbons, and other compounds, e.g. perfluorinated alkanes, such as perfluorohexane, fluorochlorocarbons, and ethers, esters, ketones, acetals, and/or a liquid form of carbon dioxide. The amount used of the blowing agent here can be as desired. The amount used of the blowing agent is preferably such that the density of the resultant polyurethane foam is from 10 to 1000 g/L, particularly preferably from 20 to 800 g/L, and in particular from 25 to 200 g/L.

Catalysts (e) used can comprise any of the catalysts usually used for polyurethane production. These catalysts are described by way of example in "Kunststoffhandbuch, Band 7, Polyurethane" [Plastics handbook, volume 7, Polyurethanes], Carl Hanser Verlag, 3rd edition, 1993, chapter 3.4.1. Examples of those used here are organometallic compounds, preferably organotin compounds, e.g. stannous salts of organic carboxylic acids, for example stannous acetate, stannous octoate, stannous ethylhexanoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture. Other possible catalysts are basic amine catalysts. Examples of these are amidines, such as 2,3-dimethyl-3,4,5,6-tetrahydropyrimidine, tertiary amines, such as triethylamine, tributylamine, dimethylbenzylamine, N-methyl- and N-ethyl-N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-aza-bicyclo[3.3.0]octane, and preferably 1,4-diazabicyclo[2.2.2]octane, and alkanolamine compounds, such as triethanolamine, triisopropanolamine, N-methyl- and N-ethyl-diethanolamine, and dimethylethanolamine. The catalysts can be used individually or in the form of mixtures. If appropriate, the catalysts (e) used comprise mixtures of metal catalysts and of basic amine catalysts.

Particularly if a relatively large excess of polyisocyanate is used, other catalysts that can be used are: tris(dialkylaminoalkyl)-s-hexahydrotriazines, preferably tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alcoholates, such as sodium methoxide and potassium isopropoxide, and also the alkali metal or ammonium salts of carboxylic acids, e.g. potassium formate or ammonium formate, or the corresponding acetates or octoates.

Examples of the concentration of the catalysts (e) that can be used are from 0.001 to 5% by weight, in particular from 0.05 to 2% by weight in the form of catalyst or catalyst combination, based on the weight of component (b).

It is also possible to use auxiliaries and/or additives (f). It is possible here to use any of the auxiliaries and additives known for producing polyurethanes. By way of example, mention may be made of surface-active substances, foam stabilizers, cell regulators, release agents, fillers, dyes, pigments, flame retardants, hydrolysis stabilizers, and fungistatic and bacteriostatic substances. These substances are described by way of example in "Kunststoffhandbuch, Band 7, Polyurethane" [Plastics handbook, volume 7, Polyurethanes], Carl Hanser Verlag, 3rd edition, 1993, chapter 3.4.4 and 3.4.6 to 3.4.11.

When producing the polyurethane of the invention, the amounts reacted of the polyisocyanates (a), the polyols (b), the phosphorous containing polyols (c) and, if appropriate, the blowing agents (d) are generally such that the equivalence ratio of NCO groups of the polyisocyanates (a) to the total number of reactive hydrogen atoms in components (b), (c), and, if appropriate, (d) is from 0.75 to 1.5:1, preferably from 0.80 to 1.25:1. If the cellular plastics comprise at least some isocyanurate groups, the ratio used of NCO groups of the polyisocyanates (a) to the total number of reactive hydrogen atoms in component (b), (c) and, if appropriate, (d) and (f) is usually from 1.5 to 20:1, preferably from 1.5 to 8:1. A ratio of 1:1 here corresponds to an isocyanate index of 100.

There is respectively very little quantitative and qualitative difference between the specific starting materials (a) to (f) used for producing polyurethanes of the invention when the polyurethane to be produced of the invention is a thermoplastic polyurethane, a flexible foam, a semirigid foam, a rigid foam, or an integral foam. By way of example, therefore, the production of solid polyurethanes uses no blowing agents, and for thermoplastic polyurethane the starting materials used are predominantly strictly difunctional. It is also possible by way of example to use the functionality and the chain length of the relatively high-molecular-weight compound having at least two reactive hydrogen atoms to vary the elasticity and hardness of the polyurethane of the invention. This type of modification is known to the person skilled in the art.

By way of example, the starting materials for producing a solid polyurethane are described in EP 0989146 or EP 1460094, the starting materials for producing a flexible foam are described in PCT/EP2005/010124 and EP 1529792, the starting materials for producing a semirigid foam are described in "Kunststoffhandbuch, Band 7, Polyurethane" [Plastics handbook, volume 7, Polyurethanes], Carl Hanser Verlag, 3rd edition, 1993, chapter 5.4, the starting materials for producing a rigid foam are described in PCT/EP2005/010955, and the starting materials for producing an integral foam are described in EP 364854, U.S. Pat. No. 5,506,275, or EP 897402. In each case, the phosphorous containing polyol (c) is then also added to the starting materials described in said documents.

In another embodiment of the present invention, the phosphorous containing polyol (c) has OH groups. Here, the phosphorous containing polyol (c) is preferably adapted in relation to functionality and OH number in such a way that there is only slight impairment of the mechanical properties of the resultant polymer, or preferably indeed an improvement therein. At the same time, change to the processing profile is minimized. This type of adaptation can by way of example be achieved in that the OH number and functionality of the compound (c) are within the region of the OH number and functionality of the polyol used for polyurethane production.

If the phosphorous containing polyol (c) has OH groups, the production of flexible polyurethane foams preferably uses, as phosphorous containing polyol (c), a compound which has an OH number of from 2 to 200 mg KOH/g, particularly preferably from 10 to 180 mg KOH/g, and in particular from 20 to 100 mg KOH/g, with an OH functionality which is preferably from 2 to 4, particularly preferably from 2.1 to 3.8, and in particular from 2.5 to 3.5.

If the phosphorous containing polyol (c) has OH groups, the production of rigid polyurethane foams preferably uses, as phosphorous containing polyol (c), a compound which has an OH number which is preferably from 2 to 800 mg KOH/g, particularly preferably from 50 to 600 mg KOH/g, and in particular from 100 to 400 mg KOH/g, with an OH functionality which is preferably from 2 to 8, particularly preferably from 2 to 6.

If the phosphorous containing polyol (c) has OH groups, the production of thermoplastic polyurethane (TPU) preferably uses, as phosphorous containing polyol (c), a compound which has an OH number of from 2 to 600 mg KOH/g, particularly preferably from 10 to 400 mg KOH/g, and in particular from 20 to 200 mg KOH/g, with an OH functionality which is preferably from 1.8 to 2.2, particularly preferably from 2.9 to 2.1, and in particular 2.0.

If a polyisocyanurate foam is produced, using a ratio of NCO groups of the polyisocyanates (a) to the total number of reactive hydrogen atoms in component (b), (c), and, if appropriate, (d) and (f) which is from 1.5 to 20:1, the OH functionality of component (c) is preferably from 2 to 3, with an OH number which is preferably from 20 to 800 mg KOH/g, particularly preferably from 50 to 600 mg KOH/g, and in particular from 100 to 400 mg KOH/g.

However, it is also possible in all cases to use any of the phosphorous containing polyols (c).

It is preferable here that the phosphorous containing polyol comprising at least one phosphorus-containing group (c) is soluble in the polyols (b). "Soluble" here means that after 24 h of standing at 50° C. no second phase that is visible to the naked eye has formed in a mixture of polyol component (b) and component (c) in the ratio corresponding to the amount subsequently used for producing the polyurethane. Solubility here can by way of example be improved via functionalization of component (c) or, respectively, the phosphorous containing polyol of the invention, for example by using alkylene oxide.

The present invention is also directed to the use of a phosphorus containing polyol as disclosed above or a phosphorus containing polyol obtainable or obtained according to the process as disclosed above as a flame retardant. Furthermore, the present invention is directed to the use of a phosphorus containing polyol as disclosed above or a phosphorus containing polyol obtainable or obtained according to the process as disclosed above for the preparation of a polyurethane with improved flammability properties.

The present invention is also directed to a polyurethane obtainable or obtained by a process for the preparation of a polyurethane as disclosed above. According to a further embodiment, the present invention is directed to a polyurethane as disclosed above, wherein the polyurethane is a polyurethane foam.

The present invention includes the following embodiments, wherein these include the specific combinations of embodiments as indicated by the respective interdependencies defined therein.

1. A phosphorus containing polyol, obtainable or obtained by a process comprising the reaction of at least one polyol with a phosphorus containing compound of the general formula (I):

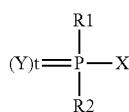

wherein X represents Cl, Br, I, alkoxy, or hydrogen,
Y represents O or S,
t is 0 or 1,
R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-aryloxy.

2. The phosphorus containing polyol according to embodiment 1, wherein the phosphorus is present in the form of phosphate or phosphinate groups.
3. The phosphorus containing polyol according to embodiment 1 or 2, wherein the phosphorous containing polyol has an OH-functionality of from 0 to 8.
4. The phosphorus containing polyol according to any of embodiments 1 to 3, wherein the phosphorous containing polyol has a phosphorous content of from 3 to 12% by weight based on the total weight of the phosphorous containing polyol.
5. The phosphorus containing polyol according to any of embodiments 1 to 4, wherein the phosphorous containing polyol has a molecular weight of from 100 to 700 g/mol.
6. A process for preparing a phosphorus containing polyol, comprising the reaction of at least one polyol with a phosphorus containing compound of the general formula (I):

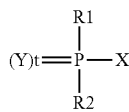

wherein X represents Cl, Br, I, alkoxy, or hydrogen,
Y represents O or S,
t is 0 or 1,
R1 and R2 independently represent C1-C16-alkyl, C2-C16-alkenyl, C2-C16-alkynyl, C1-C C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, C1-C16-alkyl-C6-C10-aryloxy.

7. The process according to embodiment 6, wherein the phosphorus is present in the form of phosphate or phosphinate groups.
8. The process according to embodiment 6 or 7, wherein the phosphorous containing polyol has an OH-functionality of from 0 to 8.
9. The process according to any of embodiments 6 to 8, wherein the phosphorous containing polyol has a phosphorous content of from 3 to 12% by weight based on the total weight of the phosphorous containing polyol.
10. The process according to any of embodiments 6 to 9, wherein the phosphorous containing polyol has a molecular weight of from 100 to 700 g/mol.
11. Use of a phosphorus containing polyol according to any of embodiments 1 to 5 or a phosphorus containing polyol obtainable or obtained according to the process of any of embodiments 6 to 10 as a flame retardant.
12. Use of a phosphorus containing polyol according to any of embodiments 1 to 5 or a phosphorus containing polyol obtainable or obtained according to the process of any of embodiments 6 to 10 for the preparation of a polyurethane with improved flammability properties.
13. A process for the preparation of a polyurethane comprising the reaction of at least one isocyanate (a), at least one polyol (b) and at least one phosphorus containing polyol according to any of embodiments 1 to 5 or a phosphorus containing polyol obtainable or obtained according to the process of any of embodiments 6 to 10.
14. The process according to embodiment 13, wherein the at least one phosphorus containing polyol is used in an amount of 1 to 30% of the total of all polyols used.
15. Polyurethane obtainable or obtained by a process according to any of embodiments 13 or 14.
16. The polyurethane according to embodiment 15 wherein the polyurethane is a polyurethane foam.

Examples will be used below to illustrate the invention.

EXAMPLES

1. Synthesis of a Phosphorous Containing Polyol

In a 6 L Miniplant-reactor the polyol (Glycerol, ethoxylated (>1<6,5 mol EO); 787 g, 2.5 mol) was dissolved in methylenchloride (3 L) and triethylamine (323 g, 3.2 mol) under an inert atmosphere ($N_2$-inertisation). Chloro diphenylphosphate (839 g, 3.1 mol) was added during 45 min (dosage rate: 1119 g/h). The reaction temperature did not exceed 33° C. during dosage of chloro diphenylphosphate. After completion of the dosage the reaction mixture was stirred at reflux conditions (inner temperature: 42° C.), then at ambient temperature for additional 12 h.

After that, the reaction mixture was subsequently extracted with water (1×1.5 L), NaOH (1×1.0 L, 5% w/w), and water (2×1.0 L), respectively. The aqueous phases were discarded. The resulting organic phase was dried over $MgSO_4$ (1.5 kg) over night and filtered utilizing a glass filter frit (D3). The filter cake was washed with additional methylene chloride (0.5 L). The aqueous phases were combined and methylene chloride was quantitatively removed in vacuo via distillation (final conditions: 7 mbar, 80° C.).

The product was isolated as a clear colorless oil (1087 g).
OH-number: 100 mg KOH/g, according to DIN 53240;
acid number: <0.5 mg KOH/g according to DIN EN ISO 2114.
Phosphorus content: 7.4% (elemental analysis).

2. Synthesis of Polyurethanes 2.1 Synthesis of a Polyurethane Flexible Foam

Polyurethane foams were produced as indicated in table 1 and table 2 by first mixing all of the components except for metal catalysts and isocyanate. Metal catalysts were then added if appropriate and likewise incorporated by stirring. The isocyanate was weighed out separately and then added to the polyol component. The mixture was mixed until the reaction began, and was then poured into a metal box lined with plastic film. The total size of the batch was in each case 1800 g. The foam completed its reaction overnight and was separated by sawing to give test specimens.

TABLE 1

|  | V1 | E1 | E2 | E3 |
|---|---|---|---|---|
| A-Component: | | | | |
| Polyol 1 | 66.70 | 80 | 66.70 | 66.70 |
| Polyol 2 | 33.30 | 20 | 33.30 | 33.30 |
| Tegostab B8681 | 0.50 | 0.50 | 0.50 | 0.50 |
| Dabco 33 LV | 0.15 | 0.15 | 0.15 | 0.15 |
| Niax A1 | 0.05 | 0.05 | 0.05 | 0.05 |
| Diethanolamine (80% in water) | 1.49 | 1.49 | 1.49 | 0.75 |
| Ortegol 204 | 1.50 | 1.50 | 1.50 | 0.75 |
| Kosmos 29 | 0.30 | 0.20 | 0.25 | 0.18 |
| Water | 2.55 | 2.10 | 2.10 | 2.30 |
| TCPP | 12.00 | | | |
| P-Polyol 1 | | 12.00 | | |
| P-Polyol 2 | | | 12.00 | |
| P-Polyol 3 | | | | 11.97 |
| B-Component: TDI | 100 | 100 | 100 | 100 |
| Index: | 107 | 107 | 107 | 107 |
| Mechanics: | | | | |
| Density [g/l] | 35.5 | 34.2 | 36.1 | 32.6 |
| CLD (40%) [kPa] | 3.6 | 3.5 | 3.3 | 4 |
| Ball Rebound [%] | 54 | 52 | 55 | 44 |
| CS 22 h/70° C./50% [%] | 7 | 6.4 | 10.5 | 11.4 |
| Tensile strength [kPa] | 100 | 86 | 98 | 121 |
| Elongation at break [%] | 109 | 109 | 96 | 140 |
| Tear resistance [N/mm] | 0.58 | 0.95 | 0.50 | 0.67 |
| Air flow [dm³/s] | 0.838 | 0.786 | 0.799 | 0.761 |
| California TB 117 | | | | |
| Average char length [mm] | 57 | 71 | 64 | 50 |
| Maximum char length [mm] | 64 | 86 | 66 | 55 |
| Average afterflame [s] | 0 | 0 | 0 | 0 |
| Maximum afterflame [s] | 0 | 0 | 0 | 0 |

The following compounds were used
Polyol 1: polyoxypropylene polyoxyethylene polyol based on glycerin; OH number: 35 mg KOH/g; functionality: 2.7
Polyol 2: Graft polyol based on styrene-acrylonitrile; solids content: 45%; polyoxypropyleneoxyethylene polyol based on glycerin; OH number: 20 mg KOH/g; functionality: 2.7
Catalyst system 1: standard catalyst system made of metal catalyst and amine catalyst
Catalyst system 2: amine catalysts partially capped by formic acid
Isocyanate 1: mixture of toluene 2,4- and 2,6-diisocyanate
P-Polyol 1: product of condensation of diphenylchlorophosphate and Polyol 3; OH number: 8 mg KOH/g; P-content 7.9%
P-Polyol 2: product of condensation of diphenylchlorophinate and Polyol 4; OH number: 137 mg KOH/g; P-content 7.3%
P-Polyol 3: product of condensation of diphenylchlorophosphate and Polyol 4; OH number: 112 mg KOH/g; P-content 7.3%
TCPP: Tris(chlorisopropyl)phosphate, commercially available halogen containing flame retardant, P-content 9.46%
Polyol 3: propoxylated glycerin; OH number: 400 mg KOH/g.
Polyol 4: ethoxylated glycerin; OH number: 535 mg KOH/g.

The following methods were used to determine properties:
Density in kg/m³: DIN EN ISO 845
Compressive strength in kPa: DIN EN ISO 3386
Rebound resilience in %: DIN EN ISO 8307
Permeability to air in dm³/s: DIN EN ISO 7231
Flame retardancy: California TB 117 A The California TB 117 A is a vertical small scale burner test for flexible PU foam. The specimen geometries are 30.5×7.5×1.3 cm. The foam is ignited by a 3.8 cm flame for 12 s.
The test is passed if:
(a) Maximum average burned length of all specimen is smaller than 15 cm
(b) Maximum burned length of each respective specimen is smaller than 20 cm
(c) The average after burning time is not higher than 5 s.
(d) The individual after burning time of each specimen is not higher than 10 s.
(e) The average after glowing time is not higher than 15 s.
(f) The test is performed before and after conditioning for 24 h at 104° C.

The test is passed if for all specimen, the specifications are fulfilled or if 1 specimen does not pass and further 5 specimen pass. Table 1 shows that the halogen-free flexible polyurethane foams of the invention exhibit very good flame retardancy, similar to or better than that of the comparative foams which were prepared using commercially available TCPP with similar or even higher phosphorus content.

It is also found that the mechanical properties of the foams are improved rather than impaired, despite the presence of the flame retardants according to the present invention.

2.2 Synthesis of a Polyurethane Rigid Foam

A polyurethane rigid foam was prepared as summarized in table 2.

The following formulation was used:
46.5 parts polyester polyol based on terephthalic acid and DEG, OH number: 243 mg KOH/g
25 parts propoxylated sorbitol, OH number: 495 mg KOH/g
6 parts polyethylenglycol, OH number: 190
20 parts flame retardant
2.5 parts stabilizer Niax L-6635 available from company Momentive
0.7 parts potassium acetate
0.4-0.7 parts Niax A1, available from company Momentive
1.3-1.6 parts water
7 parts n-pentane
Lupranat M 50, polymeric MDI of company BASF with a NCO-content of 31.5% in an amount to give a NCO-Index of 190.

Polyols, stabilizers, flame retardants, catalysts and blow agents are mixed and stirred. The isocyanate is added subsequently with stirring, and the whole mixture is foamed to a polyurethane hard foam. By adjusting the amount of catalyst the curing time is 45 seconds in each case. The density is adjusted to a constant 45 g/l through the quantity of blowing agent.

TABLE 2

|  | V2 | V3 | E4 | E5 | E6 | E7 |
|---|---|---|---|---|---|---|
| TCPP | 20 | | | | | |
| DPK | | 20 | | | | |
| P-Polyol 1 | | | 20 | | | |
| P-Polyol 4 | | | | 20 | | |
| P-Polyol 2 | | | | | 20 | |
| P-Polyol 5 | | | | | | 20 |
| water | 1.4 | 1.5 | 1.3 | 1.6 | 1.6 | 1.4 |
| Niax A1 | 0.60 | 0.65 | 0.70 | 0.50 | 0.40 | 0.55 |
| Bolt: hardness after 3 min (N) | 78 | 79 | — | — | — | 94 |

TABLE 2-continued

|  | V2 | V3 | E4 | E5 | E6 | E7 |
|---|---|---|---|---|---|---|
| Bolt: hardness after 4 min (N) | 111 | 107 | — | — | — | 128 |
| Bolt: hardness after 5 min (N) | 132 | 127 | — | — | — | 146 |
| Tack free time (s) | 68 | 73 | 64 | 63 | 63 | 58 |
| Density (g/L) | 45.2 | 44.3 | 44.2 | 44.8 | 44.8 | 45.1 |
| Compressive strength (N/mm$^2$) | 0.21 | 0.22 | — | 0.28 | 0.24 | 0.23 |
| E-module (N/mm$^2$) | 4.9 | 5.7 | — | 7.7 | 7.7 | 6.3 |
| Flaming test passed | yes | no | yes | yes | yes | yes |
| Flame height (cm) | 13.7 | 17.0 | 15.0 | 13.0 | 14.3 | 14.8 |

The following flame retardants were used:

P-Polyol 4: product of condensation of diphenylchlorophinate and Polyol 4; OH number: 127 mg KOH/g; P content 6.9%

P-Polyol 5: product of condensation of diphenylchlorophinate and Polyol 4; OH number: 75 mg KOH/g; P-content 7.9%

DPK: diphenylkresylphosphate

Tack free time: is defined as the period of time between the start of stirring and the time when hardly any tacking effect can be determined when the foam is touched with a rod. Tack free time is an indicator for the effectiveness of the polymerisation.

Bolt: 3, 4, and 5 min after mixing of the components a steel bolt with a spherical cap of 10 mm radius is pressed 10 mm into the formed foam by a tension compression fatigue testing apparatus. The maximum force necessary to achieve this (in N) is an indicator for the degree of curing of the foam. As a measure for the brittleness of the foam the time is determined, when the surface of the foam shows visible fracture zones in the bolt test. The earlier fracture zones appear the higher is the brittleness of the foam.

The flaming test is carried out according to EN ISO 11925-2.

Compressive strength and E-module were determined according to DIN 53421/DIN EN ISO 604.

The examples in Table 2 demonstrate that halogen-free polyurethane rigid foams according to the invention show an excellent flame protection similar or equal to halogen-containing comparative foams. In addition, improved mechanical properties and lower flame height are obtained.

2.3 Synthesis of a PIR Rigid Foam

A polyisocyanurate rigid foam was prepared as summarized in table 3.

The following formulation was used:

65 parts polyesterpolyol based on phthalic acid anhydride and DEG, OH number 215 mg KOH/g 8 parts polyethylenglykol, OH number 190 mg KOH/g 25 parts flame retardant 2 parts stabilizer Tegostab B 8462 available from company Evonik 0.7 parts potassium formiate 1.4-1.6 parts Niax A1 available from company Momentive 1.5-1.7 parts formic acid, 85%

9 parts n-pentane

Lupranat M 50 as polymeric MDI from company BASF with a NCO-content of 31.5% in an amount to give a NCO-Index of 330.

Polyols, stabilizers, flame retardants, catalysts and blow agents are mixed and stirred. The isocyanate is added subsequently with stirring, and the whole mixture is foamed to a polyurethane hard foam. By adjusting the amount of catalyst the curing time is 45 seconds in each case. The density is adjusted to a constant 45 g/l through the quantity of blowing agent.

TABLE 3

|  | V4 | V5 | E8 | E9 |
|---|---|---|---|---|
| TCPP | 20 |  |  |  |
| TEP |  | 20 |  |  |
| P-Polyol 2 |  |  | 20 |  |
| P-Polyol 6 |  |  |  | 20 |
| Formic acid, 85% | 1.5 | 1.5 | 1.5 | 1.7 |
| Niax A1 | 1.4 | 1.6 | 1.6 | 1.4 |
| Tack free time (s) | 67 | 69 | 66 | 67 |
| Density (g/L) | 45.4 | 44.7 | 44.2 | 44.8 |
| 3-point-bending strength (N/mm$^2$) | 0.24 | — | 0.37 | 0.36 |
| Compressive strength (N/mm$^2$) | 0.22 | 0.23 | 0.27 | 0.28 |
| BKZ5 passed | yes | yes | yes | yes |
| BKZ5 flaming heigth (cm) | 7.0 | 8.3 | 7.8 | 7.3 |

The following flame retardants were used:

P-Polyol 6: product of condensation of diphenylchlorophinate and Polyol 4; OH number: 123 mg KOH/g; P content 7.1%

TEP: Triethylphosphate

BKZ5-Test: In the flaming test according to Swiss norm BKZ/V, the flame height is measured in cm Bending strength: determined according to DIN 53423. Bending is carried out in the direction of foam development.

The examples in Table 3 demonstrate that halogen-free polyurethane rigid foams according to the invention show an excellent flame protection in combination with improved compressive strength and bending strength.

The invention claimed is:

1. A phosphorus-comprising polyol, obtained by a process comprising reacting at least one polyol with a phosphorus-comprising compound of formula (I):

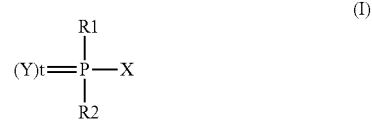

wherein

X represents Cl, Br, I, alkoxy, or hydrogen,

Y represents O or S, t is 0 or 1,

R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, or C1-C16-alkyl-C6-C10-aryloxy, wherein the phosphorus-comprising polyol comprises at least one phosphorus-comprising group of formula (II):

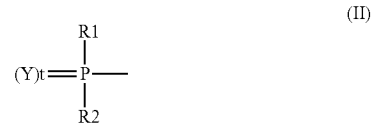

wherein

Y represents O or S, t is 0 or 1,

R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, or C1-C16-alkyl-C6-C10-aryloxy, wherein at least one of R1 and R2 represents C1-C16-alkyl, C2-C16-alkenyl, C2-C16-alkynyl, C2-C16-alkenoxy, C2-C16-alkynoxy, C3-C10-cycloalkyl, aryl, C6-C10-aryl-C1-C16-alkyl, or C1-C16-alkyl-C6-C10-aryl;

wherein the polyol is a polyether polyol produced from an epoxide, wherein a phosphorus content of the phosphorus-comprising polyol is at least 7% to 12% by weight, wherein the phosphorus-comprising polyol is halogen-free, wherein the phosphorus-comprising polyol has an OH-functionality of from 2 to 4 and a molecular weight of from 100 to 700 g/mol;

wherein the phosphorus-comprising polyol is flame retardant.

2. The phosphorus-comprising polyol according to claim 1, wherein the phosphorus is present in a form of phosphate or a phosphinate group.

3. A process for preparing a phosphorus-comprising polyol, the process comprising reacting at least one polyol with a phosphorus-comprising compound of formula (I):

wherein

X represents Cl, Br, I, alkoxy, or hydrogen,

Y represents O or S, t is 0 or 1,

R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, or C1-C16-alkyl-C6-C10-aryloxy, wherein the phosphorus-comprising polyol comprises at least one phosphorus-comprising group of formula (II):

wherein

Y represents O or S, t is 0 or 1,

R1 and R2 independently represent C1-C16-alkyl, C2-C16-alkenyl, C2-C16-alkynyl, C1-C16-alkoxy, C2-C16-alkenoxy, C2-C16-alkynoxy, C3-C10-cycloalkyl, C3-C10-cycloalkoxy, aryl, aryloxy, C6-C10-aryl-C1-C16-alkyl, C6-C10-aryl-C1-C16-alkoxy, C1-C16-alkyl-C6-C10-aryl, or C1-C16-alkyl-C6-C10-aryloxy, wherein at least one of R1 and R2 represents C1-C16-alkyl, C2-C16-alkenyl, C2-C16 alkynyl, C2-C16-alkenoxy, C2-C16-alkynoxy, C3-C10-cycloalkyl, aryl, C6-C10-aryl-C1-C16-alkyl, or C1-C16-alkyl-C6-C10-aryl;

wherein the polyol is a polyether polyol produced from an epoxide, wherein a phosphorus content of the phosphorus-comprising polyol is at least 7% to 12% by weight, and wherein the phosphorus containing polyol is halogen-free wherein the phosphorus-comprising polyol has an OH-functionality of from 2 to 4 and a molecular weight of from 100 to 700 g/mol;

wherein the phosphorus-comprising polyol is flame retardant.

4. A flame retardant, comprising the phosphorous-comprising polyol according to claim 1.

5. A process for preparing a polyurethane, the process comprising introducing the phosphorus-comprising polyol according to claim 1 into the process.

6. A process for preparing a polyurethane, the process comprising reacting at least one isocyanate (a), at least one polyol (b) and at least one phosphorus-comprising polyol according to claim 1.

7. The process according to claim 6, wherein the at least one phosphorus-comprising polyol is used in an amount of 1 to 30% of a total of all polyols.

8. A polyurethane, obtained by the process according to claim 6.

9. The polyurethane according to claim 8, wherein the polyurethane is a polyurethane foam.

10. A flame retardant, comprising a phosphorus-comprising polyol obtained from the process according to claim 3.

11. A process for preparing a polyurethane, the process comprising introducing a phosphorus-comprising polyol into the process, wherein the phosphorus-comprising polyol is obtained from the process according to claim 3.

* * * * *